(12) United States Patent
Seo et al.

(10) Patent No.: US 7,957,432 B2
(45) Date of Patent: Jun. 7, 2011

(54) LIGHT COUPLER AND FIBER LASER SYSTEM INCLUDING THE SAME

(75) Inventors: Hong Seok Seo, Daejeon (KR); Joon Tae Ahn, Daejeon (KP); Bong Je Park, Deajeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 156 days.

(21) Appl. No.: 12/379,513

(22) Filed: Feb. 24, 2009

(65) Prior Publication Data

US 2010/0111118 A1 May 6, 2010

(30) Foreign Application Priority Data

Oct. 31, 2008 (KR) .................. 10-2008-0107962

(51) Int. Cl.
*H01S 3/30* (2006.01)
*H01S 3/03* (2006.01)

(52) U.S. Cl. ............................ 372/6; 372/64
(58) Field of Classification Search .............. 372/6, 64
See application file for complete search history.

(56) References Cited

U.S. PATENT DOCUMENTS 5,864,644 A * 1/1999 DiGiovanni et al. .......... 385/43
5,999,673 A 12/1999 Valentin et al.
7,212,553 B2 * 5/2007 Starodoumov ................. 372/4
2002/0054740 A1 * 5/2002 Vakili et al. .................. 385/115

OTHER PUBLICATIONS

Y. Jeong et al., "Ytterbium-doped large-core fiber laser with 1.36 kW continuous-wave output power" Optical Society of America, 2004.

* cited by examiner

*Primary Examiner* — Armando Rodriguez
(74) *Attorney, Agent, or Firm* — Rabin & Berdo, P.C.

(57) ABSTRACT

A light coupler emitting a high power laser with a high beam quality and a fiber laser system including the light coupler is disclosed. The light coupler includes a first optical fiber bundle comprising a plurality of first optical fibers having either a single-mode core or a few-mode core and a second optical fiber, which guides multi-mode beams and is connected to the first optical fiber bundle. The optical fiber laser system includes a light coupler having a first optical fiber bundle comprising a plurality of first optical fiber having either a single-mode core or a few-mode core and a second optical fiber, which is connected to the first optical fiber bundle, is either a single cladding optical fiber or a double cladding optical fiber, and guides multi-mode beams, and one or more gain medium optical fiber, which is connected to the light coupler and emits light.

16 Claims, 8 Drawing Sheets
(2 of 8 Drawing Sheet(s) Filed in Color)

| NUMBER OF CIRCLES ALONG LONGITADINAL AXIS | | TOTAL NUMBER OF CIRCLES |
|---|---|---|
| m=1 | ○ | n=1 |
| m=3 | | n=7 |
| m=5 | | n=19 |
| m=k | | n=(3k²+1)/4, k IS ODD NUMBER |

LIGHT COUPLER AND FIBER LASER SYSTEM INCLUDING THE SAME

CROSS-REFERENCE TO RELATED PATENT APPLICATION

This application claims the benefit of Korean Patent Application No. 10-2008-0107962, filed on Oct. 31, 2008, in the Korean Intellectual Property Office, the disclosure of which is incorporated herein in its entirety by reference.

BACKGROUND OF THE INVENTION

1. Field of the Invention

The present invention relates to a fiber laser system, and more particularly, to a light coupler including an optical fiber bundle based on either a single-mode core fiber or a few-mode core fiber and a fiber laser system including the light coupler.

2. Description of the Related Art

Conventional fiber lasers may be divided into two types: single cladding optical fiber lasers and double cladding optical fiber lasers. A single cladding optical fiber laser is a laser using an optical fiber including one core and one cladding as a gain medium. The core of the single cladding optical fiber laser is generally formed of a material enabling light pumping; e.g., silica-based glass to which rare-earth elements are doped. Furthermore, since light only travels through the core, pump light should be incident into the core, and laser is emitted from the core. Since the core of the single cladding optical fiber laser has a relatively small cross-section, the amount of pump light incident thereto is limited, and thus the output power of the laser emitted from the core is limited. Meanwhile, the cross-section area of a cladding layer is tens to hundreds times larger than that of the core. Thus, if pump light can be incident into the cladding, the amount of pump light incident thereto may be significantly increased.

A double cladding optical fiber laser is an optical fiber laser in which pump light can be incident into a cladding layer. Generally, the double cladding optical fiber laser includes a single-mode core and a plurality of cladding layers. The plurality of cladding layers includes an inner cladding layer and an outer cladding layer, both of which are displaced outside the core. The inner cladding layer surrounding the core has a cross-section larger than that of the core and has a high numerical aperture. The outer cladding layer is displaced outside the inner cladding layer, and may be generally formed of a polymer having low refraction ratio. The refraction ratio of the core is slightly greater than that of the inner cladding layer, and the refraction ratio of the inner cladding layer is larger than that of the outer cladding layer. Due to such differences of refraction ratios, pump light incident through the inner cladding layer is totally reflected at the interface between the inner cladding layer and the outer cladding layer, and thus the pump light travels along the inner cladding layer and is not emitted to outside. Thus, pump light having low light quality may be easily incident into the inner cladding, and the incident pump light travels along the inner cladding and is absorbed by rare-earth elements in the core. High quality and high power laser is emitted by the rare-earth elements that are excited by the pump light.

Examples of the most popular high power pumping light source include a semiconductor array type laser diode, and various methods can be used to make a pump light incident into a double cladding optical fiber. In one of the methods, light generated by a semiconductor array type laser is made incident into an inner cladding of a double cladding optical fiber by using bulk optics. According to this method, a single-mode optical fiber laser over 1 kW can be emitted. The method is disclosed in "Optics Express (vol. 12 (25), pp. 6088, 2004)." In addition, U.S. Pat. No. 5,999,673 discloses a beam launching technique which couples a light generated by a semiconductor array type laser through an outer side of double clad fiber. Recently, a laser system for emitting laser of higher quality and power than the laser systems described above is required.

SUMMARY OF THE INVENTION

The present invention provides a light coupler efficiently combining pump beams with low quality and a fiber laser system including the light coupler is disclosed According to an aspect of the present invention, there is provided a light coupler including: a first optical fiber bundle including a plurality of first optical fibers having either a single-mode core or a few-mode core; and a second optical fiber, which has a multi-mode core and is connected to the first optical fiber bundle.

In some embodiments of the present invention, all of the plurality of first optical fibers may have the same mode. A portion of the plurality of first optical fibers may be a single-mode core fiber and the other portion of the plurality of first optical fibers may be a few-mode core fiber.

In some embodiments of the present invention, the first optical fiber bundle may be tapered such that diameter of the first optical fiber bundle decreases toward the second optical fiber for connecting with the second optical fiber.

In some embodiments of the present invention, each of the plurality of first optical fibers may include: a first core; and one or more first cladding layers. The first core may include a rare-earth element. The rare-earth element may include Yb (ytterbium), Er (erbium), Tm (thulium), or a combination thereof.

In some embodiments of the present invention, the second optical fiber may include: a second core; and one or more second cladding layers. The second core may include a rare-earth element. The rare-earth element may include Yb (ytterbium), Er (erbium), Tm (thulium), or a combination thereof. The second core may have either a single-mode or multi-mode. A second cladding layer among the one or more second cladding layers adjacent to the second core may have multi-mode. The first optical fiber bundle may be connected to the second core and the one or more second cladding layers.

According to an aspect of the present invention, there is provided an optical fiber laser system including: a light coupler including: a first optical fiber bundle including a plurality of first optical fibers having either a single-mode core or a few-mode core; and a second optical fiber, which is connected to the first optical fiber bundle, is either a single cladding optical fiber or a double cladding optical fiber, and guides multi-mode lights; and one or more gain medium optical fiber, which is connected to the light coupler and emits light.

In some embodiments of the present invention, the optical fiber laser system may further include one or more light sources that are connected to the light coupler and emit light. The one or more light sources may include a laser diode, an optical fiber laser, or both. Mode profiles of the laser diode and the optical fiber laser may be in a single-mode state or in a few-mode state, respectively.

In some embodiments of the present invention, the optical fiber laser system may further include a second optical fiber bundle including a plurality of the second optical fibers.

In some embodiments of the present invention, the optical fiber laser system of claim 17 may further include a third optical fiber connected to the second optical fiber bundle. The second optical fiber bundle may be tapered such that diameter of the second optical fiber bundle decreases toward the third optical fiber for connecting with the third optical fiber. The second optical fibers and the third optical fiber may include different rare-earth elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail exemplary embodiments thereof with reference to the attached drawings in which.

DETAILED DESCRIPTION OF THE INVENTION

Figure 1:
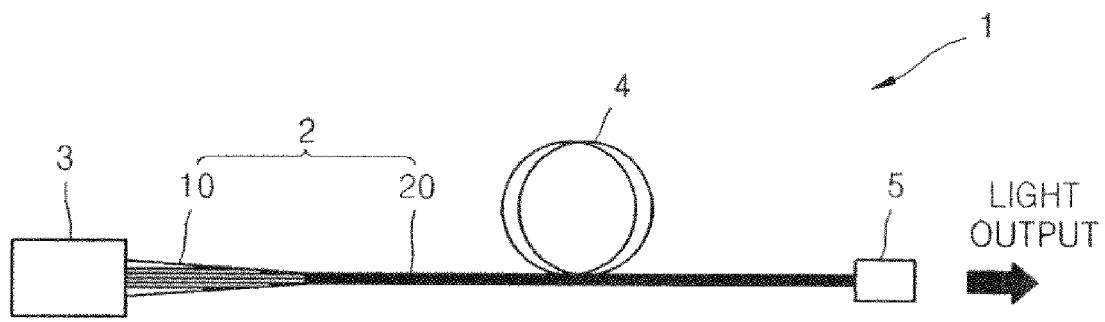
FIG. 1 illustrates an optical fiber laser system according to embodiments of the present invention.

Reference will now be made in detail to example embodiments, examples of which are illustrated in the accompanying drawings. However, example embodiments are not limited to the embodiments illustrated hereinafter, and the embodiments herein are rather introduced to provide easy and complete understanding of the scope and spirit of example embodiments. In the drawings, the thicknesses of layers and regions are exaggerated for clarity.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "above," "upper," "beneath," "below," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "above" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but may be to include deviations in shapes that result, for example, from manufacturing. For example, an implanted region illustrated as a rectangle may, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes may be not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of the inventive concept will be described in detail with reference to the accompanying drawings. In the drawings, variations from the shapes of the illustrations as a result, for example, of manufacturing techniques and/or tolerances, are to be expected. Thus, the example embodiments should not be construed as limited to the particular shapes of regions illustrated herein but may be to include deviations in shapes that result, for example, from manufacturing.

Generally, the core of an optical fiber having a single-mode may have relatively and significantly smaller diameter as compared to that of the core of an optical fiber having multi-mode. Furthermore, difference between refraction ratios of the core and cladding layers outside the core may be significantly smaller in the optical fiber having a single-mode as compared to the optical fiber having multi-mode. It may be determined whether light travelling in an optical fiber is in single-mode or not by using Equation 1 below.

$$V_{number} = \frac{\pi \times D_{core} \times NA}{\lambda} \quad \text{[Equation 1]}$$

where $D_{core}$ is the diameter of the core, $\lambda$ is the wavelength of light, and NA is the numerical aperture calculated from the difference between refraction ratios of the core and the cladding layers. Based on the numerical aperture, the critical angle at which light can be incident into the core of the optical fiber is determined. When $V_{number}$ is smaller than approximately 2.405, the light is in a single-mode at the corresponding wavelength.

There are two types of optical fibers transmitting a high power laser. The one is a hard polymer cladding fiber with a single cladding and the other is a double cladding optical fiber which is mainly used as a gain medium of a high power fiber laser. The hard polymer cladding fiber (HPCF) is an optical fiber capable of transmitting many modes. The HPCF includes a core with a large diameter and a cladding layer outside the core. The core may contain silica glass, whereas the cladding layer may contain a fluorine-doped silica or polymer having a lower refractive index. A typical numerical aperture between the core and the cladding layer is 0.22 or more. Furthermore, the size of the core in the HPCF is generally at least 100 times larger than that of the core of a single-mode optical fiber, and thus the core of the optical fiber carrying multi-mode can transmit a huge amount of light.

Other examples of optical fibers carrying large amount of light include a double cladding optical fiber, and the double cladding optical fiber has been employed for a high power optical fiber laser. The double cladding optical fiber includes the core having either a single-mode or multi-mode, and an inner cladding layer (or a first cladding layer) and an outer cladding layer (or a second cladding layer) outside the core. The core may include a rare-earth element, and the rare-earth element emits light (laser) when electrons therein are excited by light (e.g. pump light) emitted from a light source. The laser travels through the core and is emitted to outside through an output. The inner cladding layer may include silica glass, and the outer cladding layer may include polymer or silica glass including fluorine. Difference of refraction ratios between the inner cladding layer and the outer cladding layer is 0.4 or more, and thus light at various incident angles may be received into the optical fiber. Furthermore, a size of the inner cladding is generally at least 100 times larger than that of the core of an optical fiber having a single-mode, and thus a huge amount of light can be carried at the same time through the inner cladding of the optical fiber.

Examples of methods in which the pump light is incident into an inner cladding layer of a double clad fiber are described below. A first method is a direct launching technique of high power pump light with a low quality beam, which is emitted from an arrayed laser diode based on semiconductor including a diode bar or a diode stack. A second method is a technique which couples a pump beam through an outer side of double clad fiber. A third method is an end-coupling using a fiber bundle. In details, a plurality of diode bars or diode stacks are coupled into an each fiber comprising a fiber bundle and the optical fiber bundle is fusion-spliced to the double cladding optical fiber. Accordingly, pump light is incident into an inner cladding layer of the double cladding optical fiber.

FIG. 1 illustrates an optical fiber laser system 1 according to embodiments of the present invention.

Referring to FIG. 1, the optical fiber laser system 1 includes a light coupler 2, one or more light sources 3, a gain medium optical fiber 4, and a light output unit 5.

The light coupler 2 includes a first optical fiber bundle 10, which includes a plurality of first optical fibers 12a and 12b, and a second optical fiber 20 connected to the first optical fiber bundle 10. The first optical fiber bundle 10 and the second optical fiber 20 may be connected to each other either via fusion splicing or via another optical fiber so that signal distortion and connection loss of transmitted light are minimized. The first optical fiber bundle 10 may have a tapered shape for connecting with the second optical fiber 20.

The light sources 3 are connected to the light coupler 2. In other words, either all of the light sources 3 may be connected to the first optical fiber bundle 10 or each of the light sources 3 may respectively be connected to the plurality of first optical fibers 12a and 12b. The light sources 3 emit, for example, pump light, and may include a laser diode, an optical fiber laser, or both. The laser diode may be a laser diode stack, an arrayed laser diode, or a laser diode bar. However, the present invention is not limited thereto. Furthermore, the laser diode and the optical fiber laser may emit a light in a single-mode state or a few-mode state.

The plurality of first optical fibers 12a and 12b may be either a single-mode or a few-mode fiber. The few-mode fiber may include a plurality of modes, for example two or three modes. Furthermore, the second optical fiber 20 may have multi-mode.

Furthermore, all of the plurality of first optical fibers 12a and 12b may have the same fibers. For example, all of the plurality of first optical fibers 12a and 12b included in the first optical fiber bundle 10 may be either a single-mode fiber or a few-mode fiber. Alternatively, a portion of the plurality of first optical fibers included in the first optical fiber bundle 10 may be a single-mode fiber, and the other portion of the plurality of first optical fibers may be a few-mode fiber.

Furthermore, the light coupler 2 is connected to one or more gain medium optical fibers 4 at a position facing the light sources 3. The gain medium optical fibers 4 absorb the pump light incident thereto by passing through the light coupler 2 and convert the light to laser of a desired wavelength. The laser is emitted to outside via the light output unit 5.

Figure 2A:
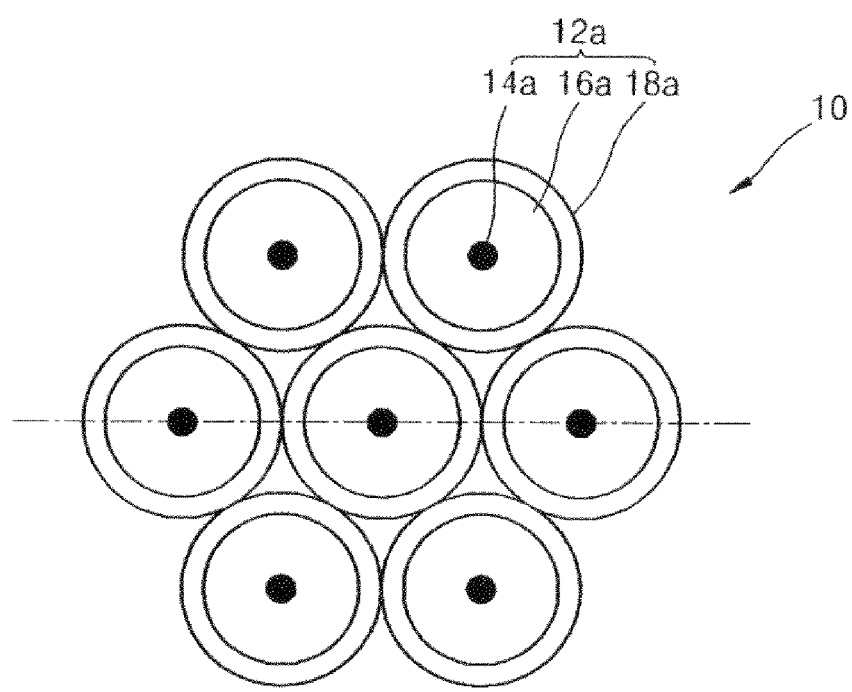
FIGS. 2A and 2B are sectional views of the first optical fiber bundle of FIG. 1 according to embodiments of the present invention, having a double cladding structure and a single cladding structure, respectively.
Figure 2B:
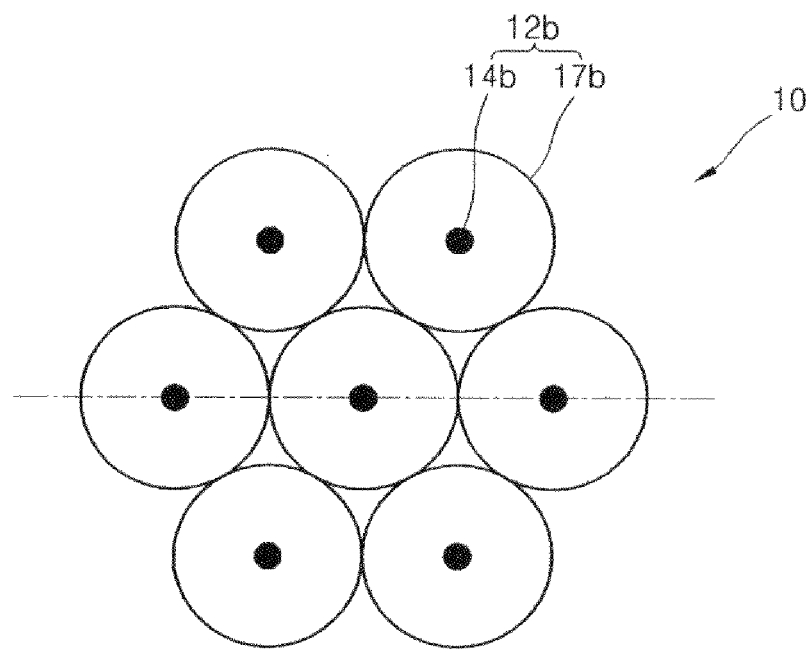

FIGS. 2A and 2B are sectional views of the first optical fiber bundle 10 according to embodiments of the present invention before performing tapering, that is, when the first optical fibers of FIG. 1 are simply tied together. FIG. 2A illustrates a case in which the first optical fiber 12a included in the first optical fiber bundle 10 is a double cladding optical fiber having a single-mode core or a few-mode core, whereas FIG. 2B illustrates a case in which the first optical fiber 12a included in the first optical fiber bundle 10 is a single cladding optical fiber having a single-mode core or a few-mode core.

Referring to FIG. 2A, each of the plurality of first optical fibers 12a may have a double cladding structure including a first core 14a and one or more first inner and outer cladding layers 16a and 18a. Referring to FIG. 2B, the first optical fibers 12b may have a single cladding structure including a single cladding layer 18b. In case of the first optical fiber 12b having the single cladding structure shown in FIG. 2B, the first optical fiber 12b includes a first core 14b and a first single cladding layer 17b. In this case, light can only travel through the first core 14b. In contrast, in case of the first optical fiber 12a having the double cladding structure shown in FIG. 2A, light can travel either through the first core 14a or the first inner cladding layer 16a. A first inner cladding layer 16a adjacent to the first core 14a may include silica glass, and the first outer cladding layer 18a surrounding the first inner cladding layer 16a may include polymer or silica glass including fluorine. In this case, refraction ratio of the first inner cladding layer 16a is greater than that of the first outer cladding layer 18a, and the first outer cladding layer 18a may be removed for a fusion-tapering.

The first cores 14a and 14b may include a rare-earth element, and may further include aluminum oxide ($Al_2O_3$) or germanium oxide ($GeO_2$). Furthermore, the rare-earth element may include ytterbium (Yb), erbium (Er), thulium (Tm), or a combination thereof. Ranges of wavelengths of emitted light are between 1030 nm 1160 nm for Yb, between 1525 nm and 1625 nm for Er or a compound of Yb and Er (Er—Yb), and between 1750 nm and 2100 nm for Tm. Refraction ratios of the first cores 14a and 14b are slightly greater than that that of the first inner cladding layer 16a or that of the first single cladding layer 17b.

Figure 3A:
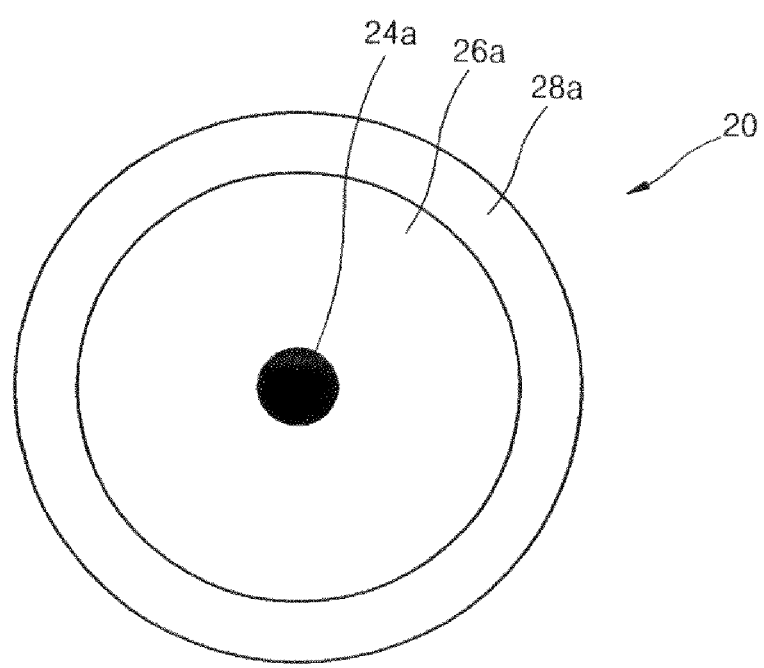
FIGS. 3A and 3B are sectional views of the second optical fiber of FIG. 1 according to embodiments of the present invention, having a double cladding structure and a single cladding structure, respectively.
Figure 3B:
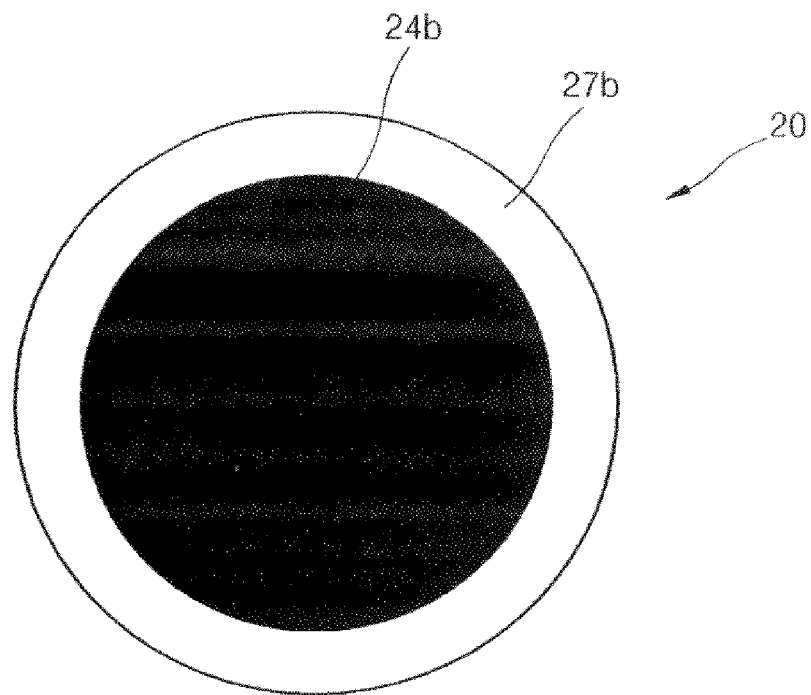

FIGS. 3A and 3B are sectional views of the second optical fiber 20 of FIG. 1 according to embodiments of the present invention. FIG. 3A illustrates a case in which the second optical fiber 20 is a double cladding optical fiber, whereas FIG. 3B illustrates a case in which the second optical fiber 20 is a single cladding optical fiber.

Referring to FIG. 3A, the second optical fiber 20 may include a second core 24a and one or more second inner and outer cladding layers 26a and 28a. The second inner cladding layer 26a adjacent to the second core 24a may include silica glass, and the second outer cladding layer 28a surrounding the second inner cladding layer 26a may include polymer or silica glass including fluorine. Refraction ratio of the second inner cladding layer 26a is greater than that of the second outer cladding layer 28a. The second core 24a may include a rare-earth element, and may further include aluminum oxide ($Al_2O_3$) or germanium oxide ($GeO_2$). Furthermore, the rare-earth element may include ytterbium (Yb), erbium (Er), thulium (Tm), or a combination thereof. Refraction ratio of the second cores 24a is slightly greater than that of the second inner cladding layer 26a. The second core 24a may be a single-mode core or a few-mode core. Furthermore, the second inner cladding layer 26a has multi-mode. Furthermore, the first optical fiber bundle 10 may be individually connected to the second core 24a and the second inner cladding layer 26a. In other words, a portion of the plurality of first optical fibers 12a and 12b included in the first optical fiber bundle 10 may be connected to the second core 24a, and the other portion of the plurality of first optical fibers 12a and 12b included in the first optical fiber bundle 10 may be connected to the second inner cladding layer 26a.

Referring to FIG. 3B, the second optical fiber 20 may have a single cladding structure including a second core 24b having multi-mode and a second single cladding layer 27b. Light can only travel through the second core 24b, and cannot travel through the second single cladding layer 27b. Furthermore, the first optical fiber bundle 10, that is, the plurality of first optical fibers 12a and 12b included in the first optical fiber bundle 10, is connected to the second core 24b.

Hereinafter, a method of emitting laser in the optical fiber laser system 1 will be described with reference to FIGS. 1 through 3B. However, the method described below is merely an example, and the present invention is not limited thereto.

For example, a case in which the first optical fiber bundle 10 includes the first optical fiber 12b having the single cladding structure as shown in FIG. 2B and the second optical fiber 20 is a double cladding optical fiber having the double cladding structure as shown in FIG. 3A will be described. The first core 14b of the first optical fiber 12b is either a single-mode core or a few-mode core, and a rare-earth element may be or may not be doped thereto. The second core 24a of the second optical fiber 20 is doped with a rare-earth element. Furthermore, the second optical fiber 20 includes the second inner and outer cladding layers 26a and 28a. Pump light travels through the core 14 b of the first optical fiber 12b, is transmitted to the second optical fiber 20, that is, to the second core 24a and to the second inner cladding layer 26a of the second optical fiber 20, and is absorbed in the second core 24a. As a result, laser is emitted through the second core 24 a.

As described above, the second optical fiber 20 may have the single cladding structure including the second single cladding layer 27b as shown in FIG. 3B. In this case, the second optical fiber 20 having multi-mode combines light from the first optical fibers.

For another example, a case in which the first optical fiber bundle 10 includes the first optical fiber 12a having the double cladding structure as shown in FIG. 2A and the second optical fiber 20 is a double cladding optical fiber having the double cladding structure as shown in FIG. 3A will be described. The first core 14a of the first optical fiber 12a is either a single-mode core or a few-mode core and is doped with a rare-earth element. The second core 24a of the second optical fiber 20 is doped with a rare-earth element. Furthermore, the second optical fiber 20 includes the second inner and outer cladding layers 26a and 28a. Laser emitted from the core of the first optical fiber 12b acts as pump light for the second optical fiber 20. The laser light is transmitted through the second core 24a and the second inner cladding layer 26a of the second optical fiber 20, and is absorbed in the second core 24a. As a result, laser is emitted. Detail explanations are as follows. Light emitted from one or more light sources 3 is incident to the plurality of first optical fibers 12a of the first optical fiber bundle 10, respectively. In other words, the light is incident into the first inner cladding layer 16a, travels through the first inner cladding layer 16a, and is absorbed in the first core 14a. Since the light is incident into the first inner cladding layer 16a having a relatively larger cross-section as compared to the first core 14a, a large amount of light can be incident into the first optical fibers 12a. Energy of the light is absorbed by the first core 14a, and thus a first laser is emitted from the first core 14a. Wavelength of the first laser may be different from that of the incident light. As described above, the first laser may have a single-transverse mode or several-transverse modes. Next, the first laser emitted from each of the plurality of first optical fibers 12a is incident into the second optical fiber 20 connected to the first optical fiber bundle 10. In other words, the first laser is incident into the second inner cladding layer 26a, travels therein, and is absorbed in the second core 24a. Since the first laser is incident into the second inner cladding layer 26a having a relatively larger cross-section as compared to the second core 24a, a large amount of the first laser can be incident into the second optical fiber 20. Energy of the first laser is absorbed by the second core 24a of the second optical fiber 20, and thus second laser is emitted from the second core 24a. Wavelength of the second laser may be different from that of the first laser. As described above, the second laser may have a single-mode or multi-mode. The second laser is emitted to the outside via the light output unit 5.

Figure 4:
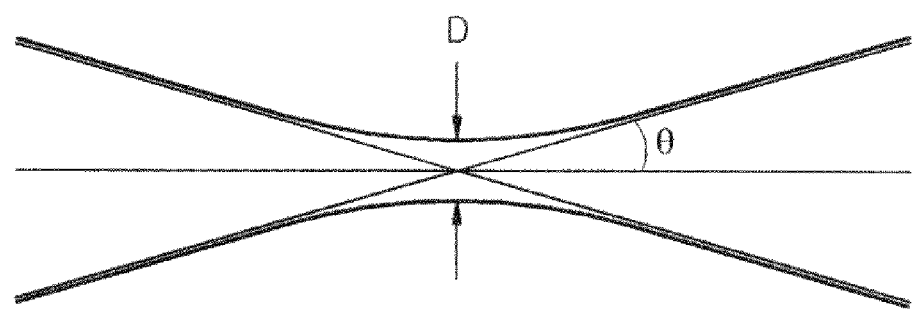
FIG. 4 illustrates a beam waist and a divergence angle for calculating a beam parameter.
Figures 5, 6:
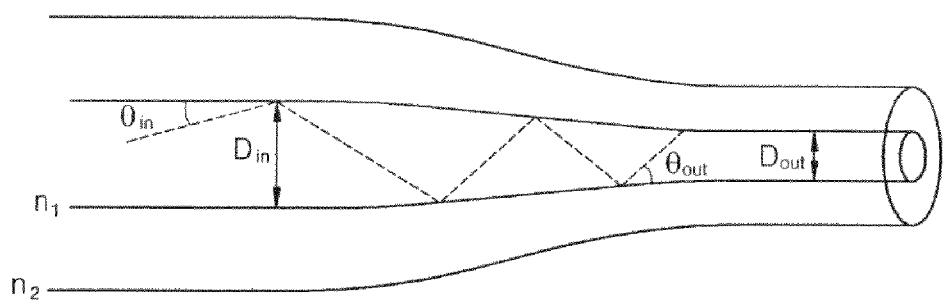
FIG. 5 is a schematic diagram for describing the relationship between a numerical aperture of a tapered optical fiber and a diameter of the core.
FIG. 6 illustrates a relationship of the total number of the optical fibers with respect to the number of the optical fibers in a direction of the diameter of an outer circle surrounding the optical fiber bundle after the optical fiber bundles are densely stacked.

Hereinafter, a method of calculating the maximum numbers of the plurality of first optical fibers 12a and 12b forming the first optical fiber bundle 10 will be described. FIG. 4 illustrates a beam waist and a divergence angle for calculating a beam parameter. FIG. 5 is a diagram for describing the relationship between a numerical aperture of a tapered optical fiber and a diameter of the core.

The beam parameter may be defined as shown in Equation 2 below.

$$BeamParameter = \frac{D}{2} \times \theta \quad \text{[Equation 2]}$$

where D is the diameter of the core of an optical fiber (that is, beam waist), and θ is the divergence angle. Regardless of the type of lens attached to the end of laser system, the beam parameter is constant, and thus the relationship in Equation 3 below can be obtained. The relationship should be established in a tapered area of an optical fiber, as shown in FIG. 5.

$$D_{in} \times \theta_{in} = D_{out} \times \theta_{out} \quad \text{[Equation 3]}$$

where $D_{in}$ and $\theta_{in}$ are a core diameter and a divergence angle before a tapered zone and $D_{out}$ and $\theta_{out}$ are a core diameter and a divergence angle after a tapered zone.

The relationship between a numerical aperture and a divergence angle is as shown in Equation 4 below. More particularly, the approximate relationship refers to the case when θ is small.

$$NA = n_1 \sin \theta \approx n_1 \theta \quad \text{[Equation 4]}$$

where NA is the numerical aperture, and $n_1$ is the refraction ratio of area through which light travels.

When Equation 4 is applied to Equation 3, Equation 5 below is obtained.

$$D_{in} \times NA_{in} = D_{out} \times NA_{out} \quad \text{[Equation 5]}$$

where $NA_{in}$ and $NA_{out}$ respectively are to numerical apertures before and after a tapered zone The maximum number of the first optical fibers 12a and 12b which can be combined in the first optical fiber bundle 10 of the light coupler 2 can be calculated by using Equation 5. Furthermore, as shown in FIG. 1, sizes of the cross-sections of the first optical fiber bundle 10 and the second optical fiber 20, the cross-sections contacting each other are different from each other. Thus, the first optical fiber bundle 10 should have a tapered shape such that the diameter of the first optical fiber bundle 10 decreases toward the second optical fiber 20 for fusion-splicing with the second optical fiber 20. Since tapering of silica fibers may be easily processed by elongating fibers with a heating source such as a flame torch, the diameter of the end of the tapered first optical fiber bundle 10 may be controlled and then matched with that of the second optical fiber 20. There is no change of beam parameter by tapering as mentioned before.

As described in FIG. 2, in case where the first optical fibers are closely packed such that the cross-section of the first optical fiber bundle 10 is a hexagon, the beam parameter of the entire first optical fiber bundle 10 is calculated by multiplying the beam parameter of each fiber forming the first optical fiber bundle 10 by the number of the first optical fibers 12a and 12b in a direction of said diameter of an outer circle surrounding the hexagon.

FIG. 6 illustrates a relationship of the total number of optical fibers with respect to the number of fibers in a direction of said diameter of an outer circle surrounding the fiber bundle 10 having a closed packed formation of the first optical fibers 12a and 12b.

The number of the first optical fibers 12a and 12b on the diagonal line in the direction of the longest axis in the hexagonal cross-section is referred to as k. In this case, the total number of the first optical fibers 12a and 12b filling the hexagonal cross-section becomes $(3k^2+1)/4$. At this point, the beam parameter at the input end is given by Equation 6 below.

$$BeamParameter = k \times D_{in} \times NA_{in} \quad \text{[Equation 6]}$$

Hereinafter, using the maximum number of the first optical fibers 12a and 12b included in the first optical fiber bundle 10, the maximum output power transmittable to the second optical fiber 20 will be calculated according to equations above, for example. In the present example, each of the first optical fibers 12a and 12b has a single-mode, the diameter of the cores is 100 μm, and the numerical aperture is 0.12. Furthermore, the second optical fiber 20 is, for example, a double cladding optical fiber. The diameter of the core of the second optical fiber 20 is 400 μm, and the numerical aperture is 0.4. To have the same beam parameter between the first optical fibers 12a and 12b and the second optical fiber 20, the number k of the first optical fibers 12a and 12b in the diameter direction is determined to 133 by Equation 6. Therefore, as shown in FIG. 6, the total number of the first optical fibers 12a and 12b is 13,267. If it is assumed that the output power of a 980 nm laser diode which can be connected to one of the first optical fibers 12a and 12b is 0.3 W, the maximum output power transmittable to the second optical fiber 20 theoretically becomes 3.9 kW.

A commercialized bundle type light coupler in the prior art (U.S. Pat. No. 5,864,644) is described below as a comparative embodiment. A case in which the first optical fiber bundle 10 has multi-mode instead of a single-mode is considered. Generally, the diameter of the core is 100 μm and the numerical aperture is 0.22 in an optical fiber having multi-mode in the prior art. It is assumed that the diameter of the core is 400 μm and the numerical aperture is 0.4 in the second optical fiber 20 in the prior art. According to the above equations, the calculated total number of optical fibers having multi-mode in the prior art is 37. Furthermore, when a laser emitting optical power of 20 W (a typical power level supplied in a commercially available laser chip) is incident into each of the optical fibers having multi-mode, the total pumping power in the prior art is 740 W. Therefore, it is clear that amount of pump light which can be combined by an optical fiber bundle type light coupler comprising single-mode or few-mode core fibers according to the present invention is significantly larger as compared to a multi-mode based bundle type light coupler in the prior art. Thus, a high power laser can be generated using this fiber bundle type coupler.

Furthermore, the present invention may provide technical merits as described below. In other words, according to the present invention, not only the first optical fibers 12a and 12b can be connected to a double cladding optical fiber such as the second optical fiber 20 as described above, but also the bundled optical fibers can be connected to an optical fiber having multi-mode core as the second optical fiber 20. If it is assumed that a core of optical fiber having multi-mode has a step index, diameter of 50 μm, and a numerical aperture of 0.12, the total number of single-mode optical fibers which can be connected to the optical fiber having multi-mode becomes 19. The output power of a commercialized semiconductor laser diode with a pigtailed fiber of which core diameter is 50 μm and numerical aperture is 0.12, is approximately 1 W, for example. In contrast, in case of using an optical fiber bundle comprising optical fibers having a single-mode core, the maximum possible output power of the light coupler is 5.7 W when a laser of which power is 0.3 W is supplied to each of the optical fibers. Therefore, it is possible to increase the output power able to be transferred into an optical fiber having multi-mode by using a fiber bundle type coupler based on optical fibers having a single-mode core.

Figure 7:
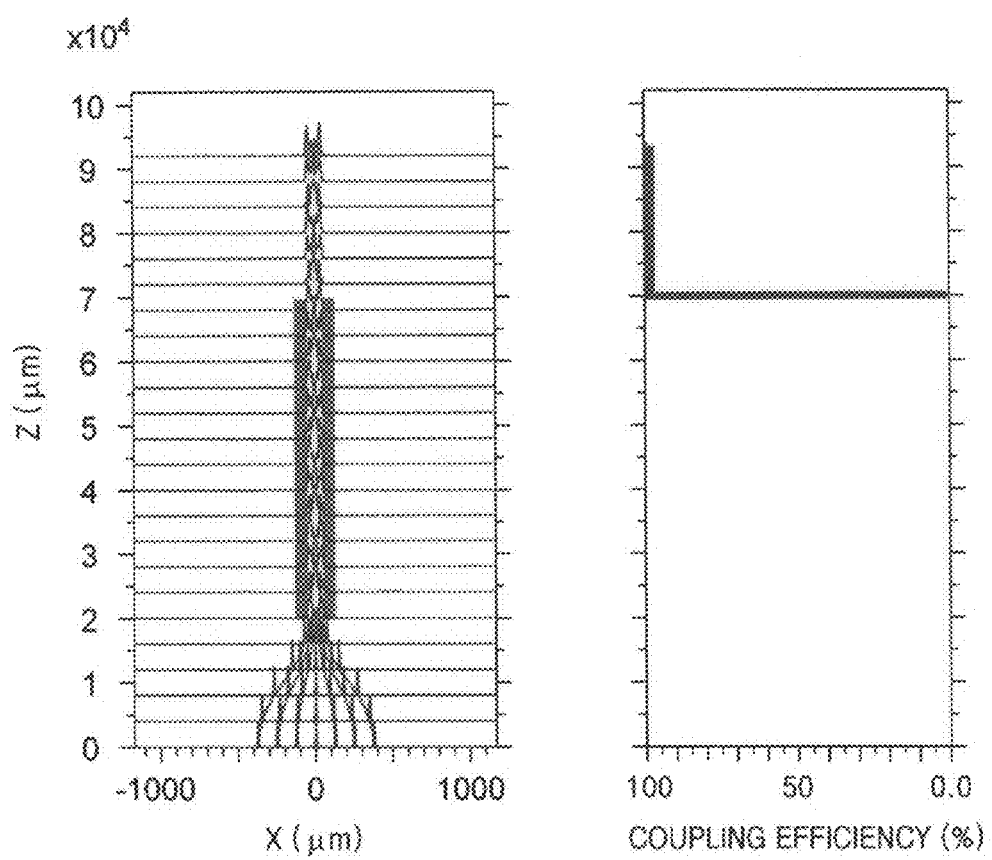
FIGS. 7 and 8 illustrates simulation results of light travelling in an area at which the first optical fiber bundle and the second optical fiber are connected to each other in the optical fiber laser system shown in FIG. 1, according to embodiments of the present invention.
Figure 8:
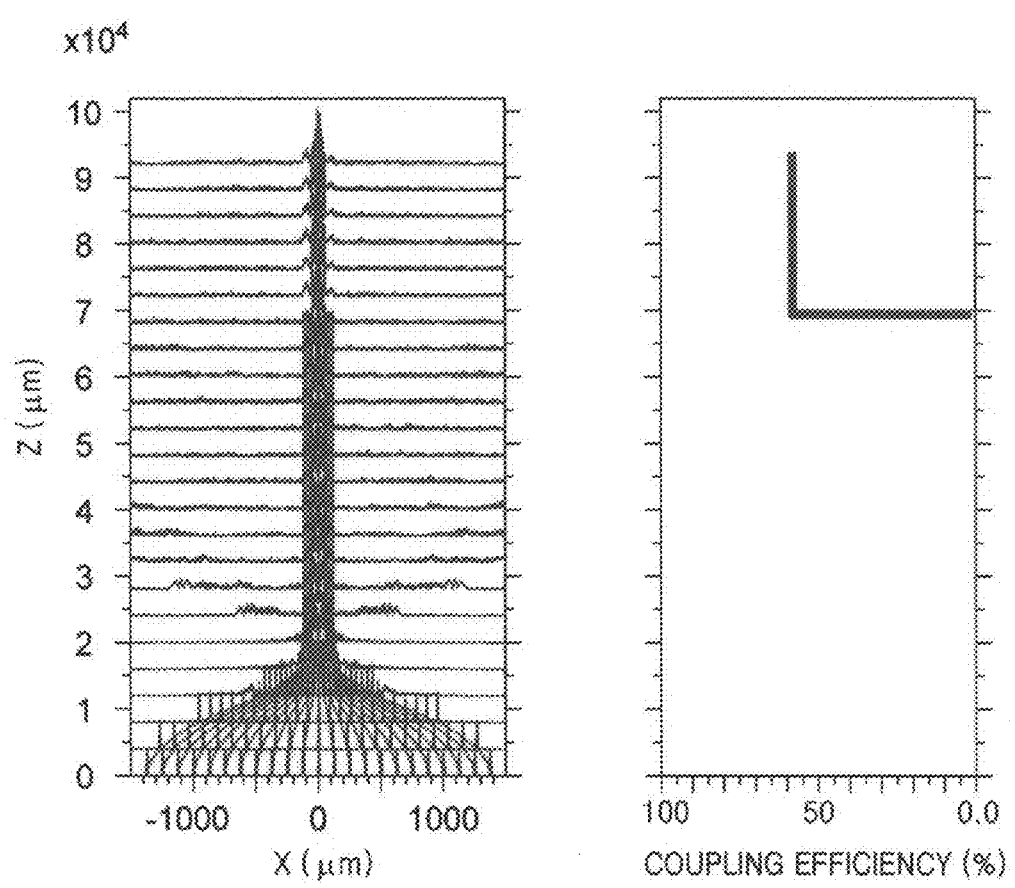

FIGS. 7 and 8 illustrates simulation results of light travelling in an area at which the first optical fiber bundle 10 and the second optical fiber 20 are connected to each other in the optical fiber laser system shown in FIG. 1, according to embodiments of the present invention.

In FIGS. 7 and 8, the first input optical fibers 10 used in a bundle type optical coupler are single-mode fibers and the second optical fiber 20 connected to the output port of a bundle type optical coupler is multi-mode fiber having a large core.

The computer program, "Beam Prop" which is commercially available is used for the simulation. In case of the first optical fiber having a single-mode, the numerical aperture is assumed to be 0.12, the core diameter is assumed to be 9 μm, and the external diameter of a cladding layer is 125 μm. As described above, the optical fibers having a single-mode are combined together and tapered to each other to form a tapered optical fiber bundle, and the optical fiber bundle is fusion spliced to an optical fiber having multi-mode. In case of the optical fiber having multi-mode, the diameter of the core is assumed to be 110 μm and the numerical aperture is assumed to be 0.22. According to the equations above, the total number of optical fibers having a single-mode which can form an optical fiber bundle is 331.

FIG. 7 illustrates a case in which an optical fiber bundle is formed by combining 37 optical fibers having a single-mode core and the optical fiber bundle is connected to an optical fiber having multi-mode. The left graph of FIG. 7 indicates travelling characteristics of light, and the right graph of FIG. 7 indicates a result of dividing the total power coupled into the second fiber 20 by the sum of input powers, that is, the coupling efficiency. Since FIG. 7 illustrates a result with respect to one longitudinal-section in a diameter direction of an outer circle surrounding an optical fiber bundle, it is shown that the number of input optical fibers is 7, but the total number of the optical fibers is actually 37. Although only the single-mode core of the optical fiber is displayed without a cladding layer, the refraction coefficient of surroundings of the single-mode cores is assumed to be the refraction coefficient of a pure silica glass. Therefore, this model is enough to simulate the fiber bundle comprising the 37 input single-mode fibers 10 and the output multimode fiber 20. According to the simulation results illustrated in FIG. 7, light travelling from an optical fiber having a single-mode core is almost entirely coupled and is incident into the second optical fiber 20 having multi-mode.

FIG. 8 illustrates a case in which the total number of optical fibers having a single-mode core which form an optical fiber bundle is 397. The number is greater than the value 331 calculated above, that is, a theoretical limit. The left graph of FIG. 8 indicates travelling characteristics of light, and the right graph of FIG. 8 indicates a result of the power coupling efficiency. In this case, a significant amount of power is leaked to the outside, and thus, as indicated in the right graph of FIG. 8, the coupling efficiency is approximately 58%.

Figure 9:
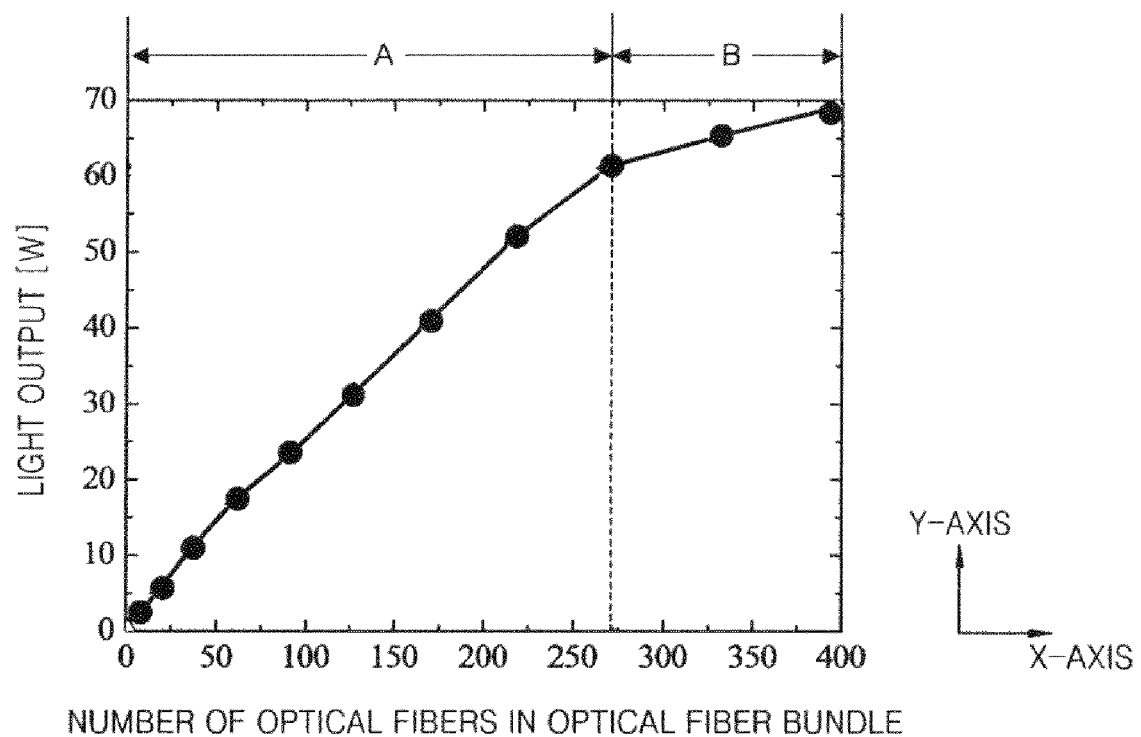
FIG. 9 is a graph illustrating a relationship of a coupled light power with respect to the total number of optical fibers in the optical fiber bundle, according to embodiments of the present invention.

FIG. 9 is a graph indicating an amount of light which can be coupled by a secondary optical fiber having a multi-mode core according to the number of the first input optical fibers under the conditions of optical fibers described with respect to FIGS. 7 and 8. The x-axis of FIG. 9 indicates the number of optical fiber bundles having a single-mode core, whereas the y-axis of FIG. 9 indicates the light output power coupled into the second optical fiber having multi-mode. It is assumed that laser of which power is 0.3 W is supplied to each of input optical fibers having a single-mode core, and the result shown in FIG. 9 is a simulation result using "Beam Prop."

Referring to FIG. 9, when the number of optical fibers having a single-mode core in an optical fiber bundle increases, the coupled output power increases. However, the coupling efficiency is excellent in a case where the number of optical fibers is 271 or less (area A), and gradually decreases in a case where the number of optical fibers is greater than 271 (area B). As calculated using the equations above, in a case where a critical number, which is 331, of optical fibers is included in an optical fiber bundle, the coupling efficiency is 66%. The reason of decreased coupling efficiency in case of the critical number is that light partially travels in a cladding as an evanescent wave, and the evanescent wave is excluded from the simulation results. In contrast, in case where 271 optical fibers as an input fiber are included in an optical fiber bundle, light having a total power of 61 W (in case that each input fiber supplies a power of 0.3 W) is incident into an optical fiber having multi-mode (in case where the diameter of the core is 110 μm and the numerical aperture is 0.22), the optical fiber connected to the optical fiber bundle. Since the maximum output power of a commercially available laser diode, which is pigtailed with the same multimode fiber used for the above simulations, is 25 W, the output power of a bundle-type light coupler according to the present invention is more than twice the maximum output power of the laser diode. Furthermore, if the output power of each of optical fibers having a single-mode core is more than 0.3 W, the maximum coupled power of an optical fiber having a multi-mode core can increase further.

Figure 10:
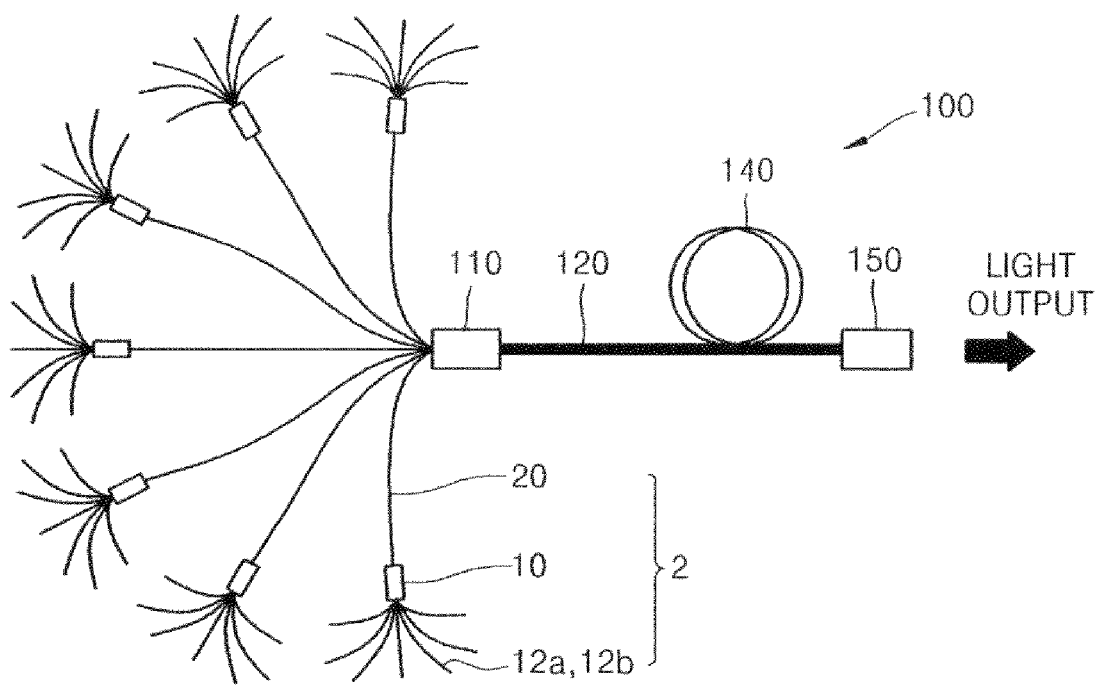
FIG. 10 illustrates an optical fiber laser system according to other embodiments of the present invention.

FIG. 10 illustrates an optical fiber laser system 100 according to other embodiments of the present invention.

Referring to FIG. 10, the optical fiber laser system 100 may include a second optical fiber bundle 110 in which the light couplers 2 as described above are combined together by using a method such as fusion splicing. Furthermore, the second optical fiber bundle 110 may be formed by combining a plurality of the second optical fibers 20 together, and the second optical fiber bundle 100 may be connected to a third optical fiber 120 by using a method such as fusion splicing. And the second fibers 20 connected to the output port of the first optical fiber bundle 10 act as an input fibers of the second optical fiber bundle 120. Light traveled through the third optical fiber 120 may pass through a gain medium optical fiber 140 and excites rare earth ions doped in the core of the third fiber 140. Then, the light is emitted to outside via a light output unit 150. Although not shown, each of the first optical fibers 12a and 12b and/or the second optical fibers 20 may include such a gain medium optical fiber (not shown).

According to the current embodiment, the second optical fiber bundle 110 may have a tapered shape such that the diameter of the second optical fiber bundle 110 decreases toward the third optical fiber 120 for connecting with the third optical fiber 120. Furthermore, the first optical fibers 12a and 12b and/or the second optical fiber 20 in the light coupler 2 may include a rare-earth element in their cores, the rare-earth element such as Yb, Er, Tm, or a combination thereof, for example. The third optical fiber 120 may include a different rare-earth element in its core. For example, the cores of the first optical fibers 12a and 12b and/or the second optical fiber 20 may include Er, whereas the core of the third optical fiber 120 may include Tm.

The present invention discloses a light coupler in which an optical fiber bundle is formed by combining optical fibers having either a single-mode core or a few-mode core together and the optical fiber bundle is connected to an optical fiber having multi-mode. Such a light coupler can more efficiently combine light travelling in each of optical fibers having a single-mode core, thus a fiber laser system using this light coupler can emit high power laser with high beam quality. Furthermore, the optical fiber bundle based on either single-mode core fibers or few-mode core fibers may be connected to each of input multimode fibers of a commercialized optical fiber bundle.

Furthermore, a light coupler according to the present invention may combine high power optical fiber lasers emitting a single-mode beam.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light coupler comprising:
   a first optical fiber bundle including a plurality of first optical fibers having either a single-mode core or a few-mode core; and
   a second optical fiber, which has multi-mode core and is connected to the first optical fiber bundle,
   wherein each of the plurality of first optical fibers includes a first core and one or more first cladding layers, and
   wherein the first core includes a rare-earth element.

2. The light coupler of claim 1, wherein all of the plurality of first optical fibers have the same number of modes.

3. The light coupler of claim 1, wherein the first optical fiber bundle is tapered such that diameter of the first optical fiber bundle decreases toward the second optical fiber for connecting with the second optical fiber.

4. The light coupler of claim 1, wherein the rare-earth element includes Yb (ytterbium), Er (erbium), Tm (thulium), or a combination thereof.

5. The light coupler of claim 1, wherein the second optical fiber comprises:
   a second core; and
   one or more second cladding layers.

6. The light coupler of claim 5, wherein the second core comprises a rare-earth element.

7. The light coupler of claim 6, wherein the rare-earth element includes Yb (ytterbium), Er (erbium), Tm (thulium), or a combination thereof.

8. The light coupler of claim 5, wherein the second optical fiber has a single-mode core or a multi-mode core.

9. The light coupler of claim 5, wherein a second cladding layer among the one or more second cladding layers adjacent to the second core guides multi-mode beams.

10. The light coupler of claim 5, wherein the first optical fiber bundle is connected to the second core and the one or more second cladding layers.

11. An optical fiber laser system comprising:
    a light coupler including:
       a first optical fiber bundle including a plurality of first optical fiber having either a single-mode core or a few-mode core; and
       a second optical fiber, which is connected to the first optical fiber bundle, is either a single cladding optical fiber or a double cladding optical fiber, and guides multi-mode beams through core or cladding layers; and
    one or more gain medium optical fiber, which is connected to the light coupler and emits light,
    wherein each of the plurality of first optical fibers includes a first core and one or more first cladding layers, and
    wherein the first core includes a rare-earth element.

12. The optical fiber laser system of claim 11, further comprising one or more light sources that are connected to the light coupler and emit light,
    wherein the one or more light sources includes a laser diode, an optical fiber laser, or both.

13. An optical fiber laser system comprising:
    a light coupler including:
       a plurality of first optical fiber bundles, each first optical fiber bundle including a plurality of first optical fibers having either a single-mode core or a few-mode core; and
       a second optical fiber bundle including a plurality of second optical fibers, each second optical fiber being connected to each first optical fiber bundle, each second optical fiber being either a single cladding optical fiber or a double cladding optical fiber, each second optical fiber guiding multi-mode beams through core or cladding layers; and
    one or more gain medium optical fiber, which is connected to the light coupler and emits light,
    wherein each of the plurality of first optical fibers includes a first core and one or more first cladding layers, and
    wherein the first core comprises a rare-earth element.

14. The optical fiber laser system of claim 13, further comprising a third optical fiber connected to the second optical fiber bundle.

15. The optical fiber laser system of claim 14, wherein the second optical fiber bundle is tapered such that diameter of the second optical fiber bundle decreases toward the third optical fiber for connecting with the third optical fiber.

16. The optical fiber laser system of claim 14, wherein the second optical fibers and the third optical fiber comprise different rare-earth elements.

* * * * *